Nov. 13, 1934.                L. C. BRISSON                1,980,611
                                BRAKE
                        Filed Oct. 28, 1932           4 Sheets-Sheet 1

L. C. Brisson
INVENTOR

By Marks & Clerk
ATTYS.

Nov. 13, 1934.  L. C. BRISSON  1,980,611
BRAKE
Filed Oct. 28, 1932  4 Sheets-Sheet 3

L. C. Brisson
INVENTOR

Marks & Clerk
Attys.

Patented Nov. 13, 1934

1,980,611

UNITED STATES PATENT OFFICE 1,980,611

BRAKE

Louis Charles Brisson, Boulogne-sur-Seine, France, assignor to Société Anonyme: Société des Freins Hydrauliques S. de Lavaud, Paris, France Application October 28, 1932, Serial No. 640,098
In France November 3, 1931

4 Claims. (Cl. 188—78)

In hydraulically controlled brakes, it is a recognized fact that the device receiving the hydraulic pressure should be arranged outside the fixed cheek member, so that it should not be subjected to the heat evolved within the brake drum.

Consequently, it was necessary to provide a stress transmitting device between the plunger of the device receiving the hydraulic pressure and the brake jaws.

A device has already been proposed which consists in a parallel motion the joints of which serve as axes for bearing rollers. One of these rollers is in contact with the driving plunger, and the opposite roller bears against a fixed surface. The two other rollers respectively bear against both receiving plungers.

This proposed device has inconveniences, particularly when it is used for actuating the brakes of any vehicle, and especially self-applying brakes.

In this specification, in order to define the ends of the brake jaws and the plunger which respectively correspond to said ends, reference will be made to the direction of rotation of the brake drum. By starting from the actuating device, and by moving in the direction of rotation of the drum, the first plunger and the first jaw encountered will be designated by the terms "first plunger" and "first jaw", whilst the last jaw and the last plunger encountered will be designated by the terms "last plunger" and "last jaw".

It will be understood that, in this application (and for instance when the brakes are applied during forward running) the roller bearing against the last plunger (that on which bears the last jaw) remains stationary, as well moreover as the roller bearing against the fixed wall. In these conditions, the axis of the roller bearing against the driving plunger moves according to an arc of circle which greatly departs from the straight line according to which the piston moves, because the adjacent side of the parallel motion forms, with this straight line, an angle very different from 90°. The same is true for the plunger bearing against the first plunger.

Consequently, a friction is produced between the driving plunger and its roller, on the one hand, and between the first plunger and its roller, on the other hand, which friction can be considerable. In fact, the diameter of the rollers cannot be very large and very different from that of their spindles, owing to cumbersomeness. The rolling friction taking place is not therefore very different from the sliding friction which would occur if the rollers were fast on their spindles; this parasitic friction is extremely prejudicious to proper balancing of the brakes, as it often happens that it is very different for the two homologous wheels (for instance the front wheels). The consequences of this unbalancing are more particularly to be feared if it is considered that the inclination of the sides of the parallel motion on the axes on which the plungers move progressively increase towards 90° for the parallel motion first actuated, that is to say for that having the least friction. This increase of inclination has for effect, on the one hand, to further diminish this friction and, on the other hand, to increase the transmission from a higher to a lower speed produced by the parallel motion, this consequently accentuating unbalancing in proportion as the brakes are applied.

The main object of the present invention is to avoid these inconveniences, and for that purpose, to impart to the rollers (at least in the direction of forward running) a movement differing as slightly as possible from that of the plunger with which they come in contact.

It is mainly characterized by the fact that the spindle of the roller associated with the driving plunger and that of the roller associated with the plunger first encountered when running forward are mounted on a lever pivoted on a support bearing, on the one hand, on the plunger last encountered when running forward, and, on the other hand, on a fixed surface, and by the fact that the pivoting axis of the lever is situated at the intersection of two planes extending through the axes of the rollers in their initial position and forming, with the directions of movement of the pistons associated therewith, an angle approximating 90°.

This angle will differ to the extent of 90° from one half the maximum angular displacement of the lever.

This invention can be carried out according to various forms of construction, particularly differing from each other by the constitution, of the support which, for reverse drive, plays an active part and must therefore, in this case, transmit to the first plunger (that is to say the piston first encountered when running forward) the thrust of the driving plunger. The following forms of construction can thus be considered:

(a) The support is constituted by a carriage provided with rollers running on fixed raceways preferably displaced relatively to each other, (b) The support is constituted by a lever pivoted about a fixed axis and on which is pivoted, on the same axis as the lever carrying the actuating rollers, an arm, the free end of which extends in a corresponding recess provided in the last plunger (forward running).

(c) The support is pivoted about a fixed axis and comprises an arm bearing in a corresponding recess provided in the last piston (forward running), this arm being pivoted on the support about an axis different from that of the lever carrying the rollers.

The invention also relates to other particular points which will appear from the following description with reference to the accompanying drawings, given by way of example only, and in which.

In the various figures of the drawings, the same parts are designated by the same reference numbers.

Figure 1:
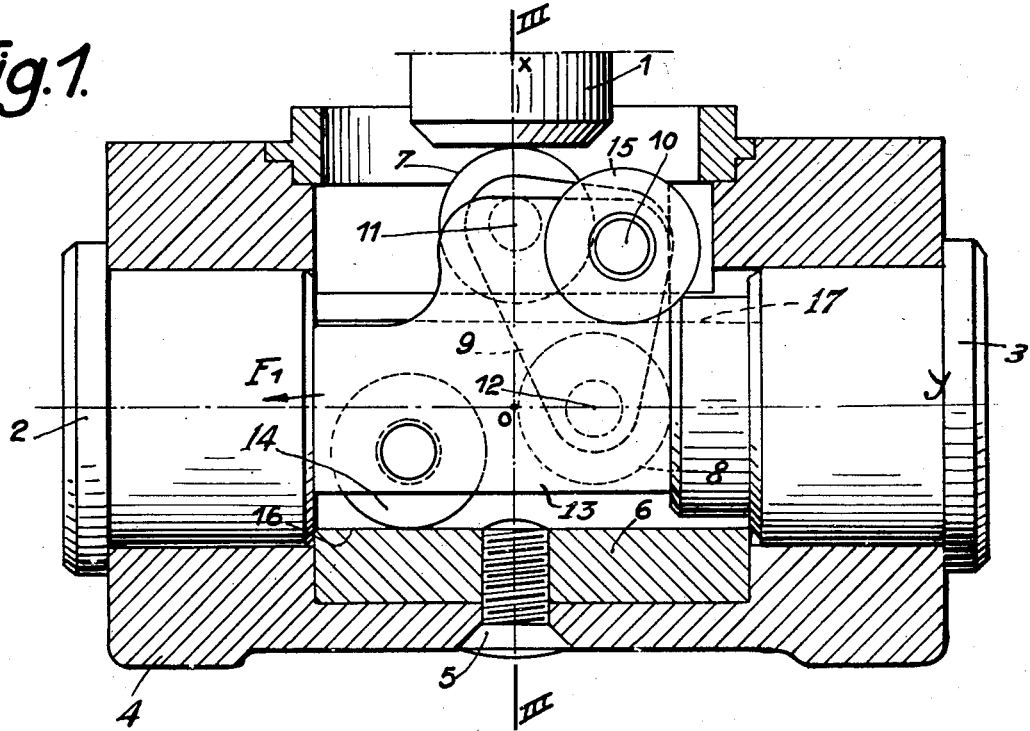
Fig. 1 is an elevation, in axial section, of a first form of construction.

The various forms of construction illustrated which are more particularly applicable to hydraulic brakes mounted on motor vehicles, comprise a driving plunger 1 and two receiving pistons 2 and 3, the piston 3 being the plunger first encountered when running forward.

The cylinders for the plungers 2 and 3 are provided in one and the same casting 4 within which a member 6 is secured through the medium of any suitable means, such as screws 5.

The lever on which the rollers 7 and 8 are journalled, which rollers respectively cooperate with the driving plunger 1 and the receiving piston 3, is indicated at 9.

Figure 2:
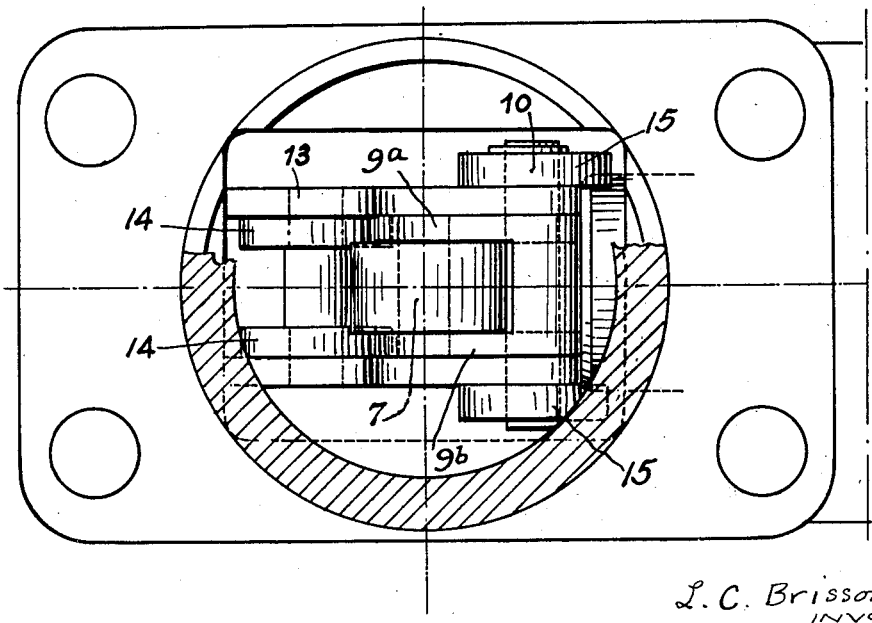
Fig. 2 is a corresponding plan view.
Figure 3:
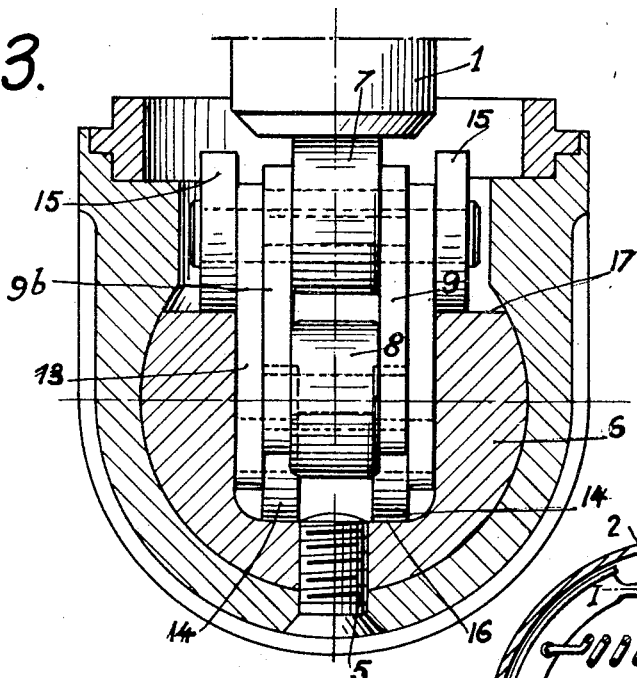
Fig. 3 is a section made according to line III—III of Fig. 1.
Figure 9:
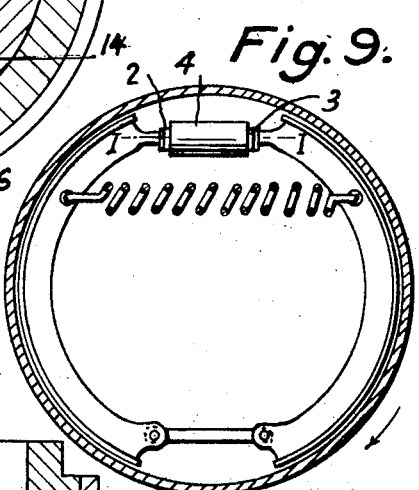
Fig. 9 is a sectional view partly in elevation showing the device applied to brake shoes.

In the first form of construction illustrated in Figs. 1, 2 and 3, the lever 9 on which the rollers 7 and 8 are journalled, is constituted by two cheek members pivoted about a pivot 10.

It will be noted that, according to the invention, the straight lines 10—11 and 10—12 (11 and 12 being respectively the axes of the rollers 7 and 8) form, with the straight lines OX and OY, angles approximating 90°, as indicated in the features of the present patent application.

The pivot or pin 10 is rigid with a carriage 13 provided with rollers 14 and 15 running on raceways 16 and 17 displaced relatively to each other, but parallel and provided on the member 6.

When applying the brakes during forward running, the plunger 1 moves from X towards O, actuating the roller 7 and, consequently, angularly moving the lever 9 about the pin 10. In fact, the carriage 13 which bears on the last plunger 2 (which is fixed during forward running) remains stationary. Owing to the angular displacement of the lever 9, the roller 8 acts on the first plunger 3 for moving it from O towards Y.

According to the invention, the displacement of the pins or spindles 11 and 12 is as near as possible to the straight lines OX and OY, respectively, according to which the plungers 1 and 3 move.

Figure 6:
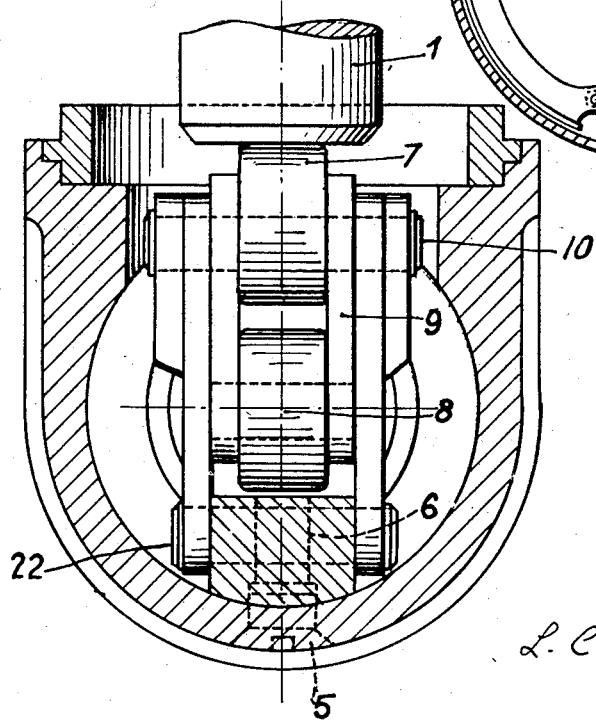
Fig. 6 is a section made according to line VI—VI of Fig. 4.
Figure 4:
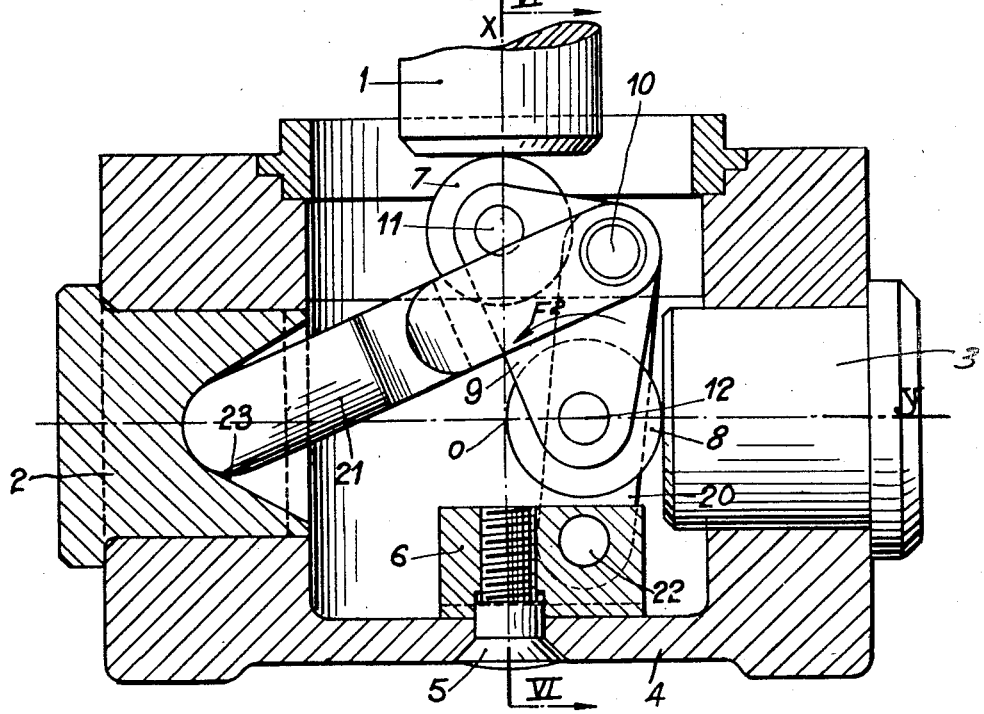
Fig. 4 is an elevation, in axial section, of a second form of construction.
Figure 5:
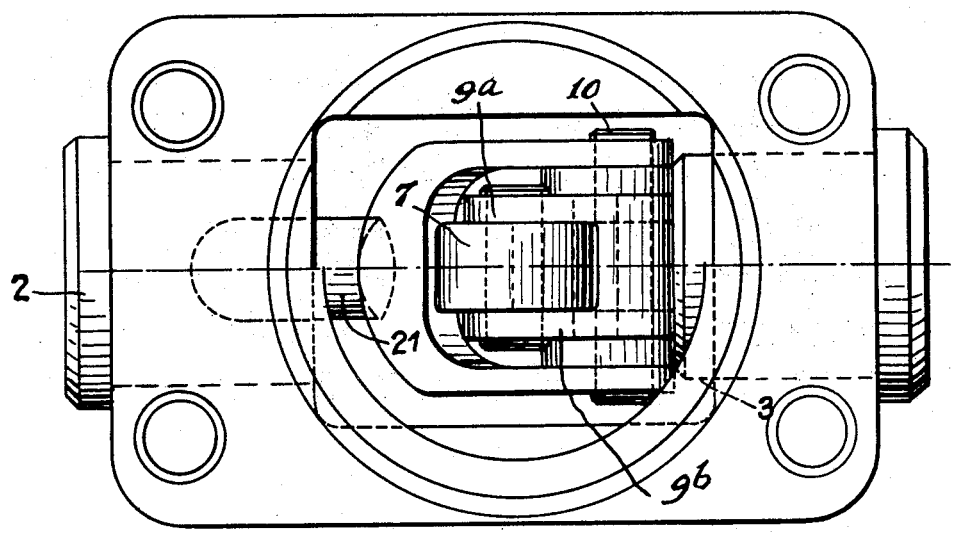
Fig. 5 is a plan view corresponding to the preceding figure.

Figs. 4, 5 and 6 illustrate a second form of construction in which the same parts are designated by the same reference numbers. In this form of construction the support is constituted by the combination of two links 20 and 21 pivoted about the common pin 10 of the lever 9. The link 20 is pivoted about a fixed pin 22 mounted in the member 6 and the free end of the link 21 bears in a recess 23 axially provided in the last plunger 2 (forward running).

The operation of this device is identical to that previously indicated, the free end of the lever 21 bearing (when applying the brakes during forward running) on the plunger 2, and the plunger 3 is moved from O towards Y by angular displacement of the lever 9.

Figure 7:
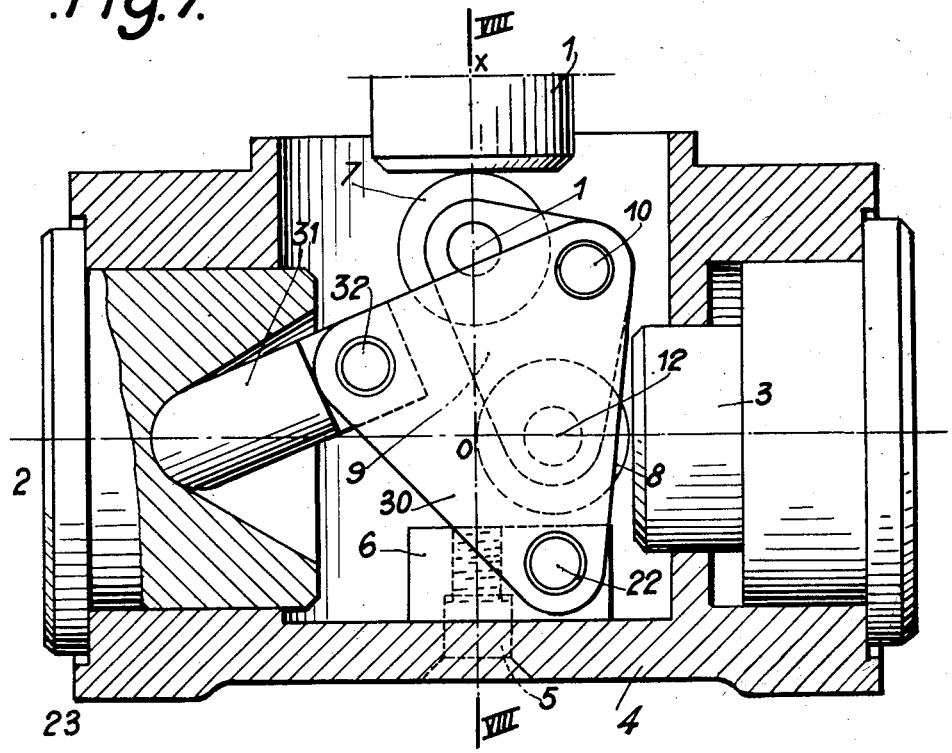
Fig. 7 is an elevation, in axial section, of a third form of construction.
Figure 8:
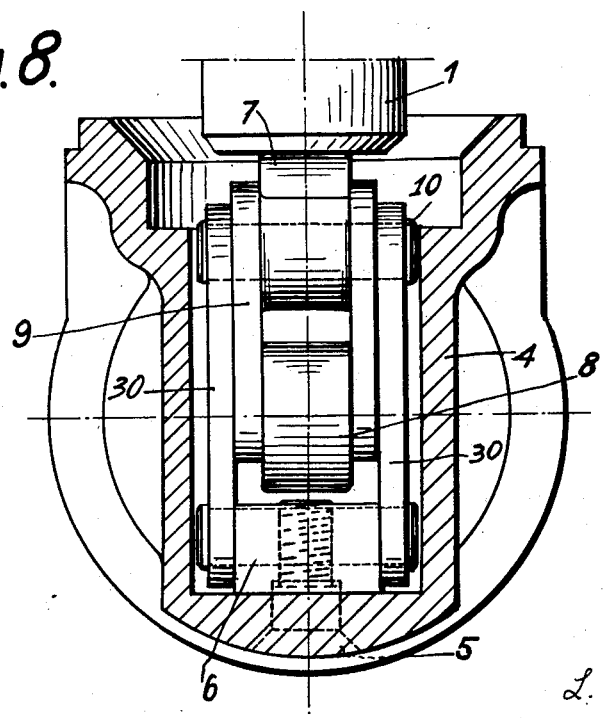
Fig. 8 is a section made according to line VIII—VIII of Fig. 7.

Figs. 7 and 8 illustrate a third form of construction in which the support is constituted by two cheek members 30 pivoted about a spindle 22 rigid with the member 6 and bears on the plunger 2, in a recess 23 provided in the latter, through the medium of an arm 31 pivoted at 32 on a support 30.

The operation is identical to that previously described (when applying the brakes during forward running).

In the various forms of construction illustrated, the plunger 1 can be driven by any suitable means (mechanical, electrical, hydraulic or like means).

For effecting braking during reverse running, the plunger 2 becomes the first plunger, movable plunger, and the plunger 3 becomes the last plunger (fixed plunger).

Braking during reverse running (first form of construction).

The roller 8 bears on the fixed plunger 3 and the angular movement of the lever 9 causes the displacement, in the direction of the arrow $F_1$, of the support or carriage 13 and, consequently, of the plunger 2. During reverse running, the displacements of the roller spindles are distinctly different (particularly concerning the spindle 11 of roller 7) from the displacements of the pistons. Braking during reverse running is substantially effected during relatively short periods of time which do not allow the sliding frictions taking place to cause unbalancing of the system.

Braking during reverse running (second form of construction).

In this case, the arm 20 angularly moves about the spindle 22 in the direction of the arrow $F_2$ and acts on the plunger 2 through the medium of the arm 23.

Braking during reverse running (third form of construction).

The operation is identical to that described for the second form of construction.

It is obvious that the invention is not limited to the forms of construction described and illustrated, but that it includes those utilizing identical means in order to obtain the balancing of the system, as indicated.

What I claim as my invention and desire to secure by Letters Patent is:

1. In a device for transmitting stresses to brake jaws, a fixed frame, two opposite movable receiving plungers having one and the same geometrical axis, a driving plunger so arranged that its geometrical axis is perpendicular to the preceding one, a bent lever, means for supporting the said lever in such a manner that one of its ends is in contact with the driving plunger and the other with one of the receiving plungers, the said supporting means being operatively associated with the other plunger.

2. In a device for transmitting stresses to brake jaws, a fixed frame, two opposite movable receiving plungers having one and the same geometrical axis, a driving plunger so arranged that its geometrical axis is perpendicular to the preceding one, a lever, rollers pivoted at each end of the lever, means for supporting the said lever in such a manner that one of the rollers is in contact with the driving plunger and the other with one of the receiving plungers, the said supporting means being operatively associated with the other plunger.

3. In a device for transmitting stresses to brake jaws, a fixed frame, two opposite movable receiving plungers having one and the same geometrical axis, a driving plunger so arranged that its geometrical axis is perpendicular to the preceding one, a lever, rollers pivoted at each end of the said lever, means for supporting this lever in such a manner that one of the rollers is in contact with the driving plunger and the other with one of the receiving plungers, the said means comprising a link connecting the pivot of the lever to a fixed joint, and another link connecting the said pivot to the second receiving plunger.

4. In a device for transmitting stresses to brake jaws, a fixed frame, two opposite movable receiving plungers having one and the same geometrical axis, a driving plunger so arranged that its geometrical axis is perpendicular to the preceding one, a lever, rollers pivoted at each end of the said lever, means for supporting this lever in such a manner that one of the rollers is in contact with the driving plunger and the other with one of the receiving plungers, the said means comprising a member pivoted on the fixed frame and connected by a link to the second receiving plunger.

LOUIS CHARLES BRISSON.